(12) United States Patent
Chauvot et al.

(10) Patent No.: US 12,071,076 B2
(45) Date of Patent: *Aug. 27, 2024

(54) METHOD FOR ADAPTING TO A DRIVER POSITION AN IMAGE DISPLAYED ON A MONITOR IN A VEHICLE CAB

(71) Applicant: VOLVO TRUCK CORPORATION, Gothenburg (SE)

(72) Inventors: Pierre-Yves Chauvot, Meyzieu (FR); Thibaut Jeanpierre, Lyons (FR)

(73) Assignee: VOLVO TRUCK CORPORATION, Gothenburg (SE)

( * ) Notice: Subject to any disclaimer, the term of this patent is extended or adjusted under 35 U.S.C. 154(b) by 116 days.

This patent is subject to a terminal disclaimer.

(21) Appl. No.: 17/793,576

(22) PCT Filed: Jan. 23, 2020

(86) PCT No.: PCT/EP2020/051679
§ 371 (c)(1),
(2) Date: Jul. 18, 2022

(87) PCT Pub. No.: WO2021/148125
PCT Pub. Date: Jul. 29, 2021

(65) Prior Publication Data
US 2023/0049492 A1 Feb. 16, 2023

(51) Int. Cl.
*G06V 10/00* (2022.01)
*B60R 1/25* (2022.01)
(Continued)

(52) U.S. Cl.
CPC ............... *B60R 1/26* (2022.01); *B60R 1/25* (2022.01); *G01G 19/08* (2013.01); *G06F 3/011* (2013.01);
(Continued)

(58) Field of Classification Search
CPC ....... B60R 1/26; B60R 1/25; B60R 2300/105; B60R 2300/20; B60R 2300/605;
(Continued)

(56) References Cited

U.S. PATENT DOCUMENTS 7,884,977 B2 * 2/2011 Mori .................. H04N 19/12
358/538
8,086,044 B2 * 12/2011 Feng .................. H04N 19/176
382/220

(Continued)

FOREIGN PATENT DOCUMENTS

GB 2417847 A 3/2006

OTHER PUBLICATIONS

International Search Report and Written Opinion of the International Searching Authority, PCT/EP2020/051679, mailed Aug. 31, 2020, 10 pages.

*Primary Examiner* — Frank F Huang
(74) *Attorney, Agent, or Firm* — Sage Patent Group

(57) ABSTRACT

The invention relates to a method for adapting to a driver position an image displayed on a monitor in a cab of the vehicle. The invention also relates to a system for adapting to a driver position an image displayed on a monitor in a cab of the vehicle. The invention further relates to a vehicle comprising such a system.

14 Claims, 3 Drawing Sheets

(51) Int. Cl.
  B60R 1/26      (2022.01)
  G01G 19/08     (2006.01)
  G06F 3/01      (2006.01)
  G06V 10/25     (2022.01)
  H04N 7/10      (2006.01)
  H04N 7/18      (2006.01)
  H04N 23/69     (2023.01)
  H04N 23/90     (2023.01)

(52) U.S. Cl.
  CPC .............. *G06V 10/25* (2022.01); *H04N 7/10* (2013.01); *H04N 7/181* (2013.01); *H04N 23/69* (2023.01); *H04N 23/90* (2023.01); *B60R 2300/105* (2013.01); *B60R 2300/20* (2013.01); *B60R 2300/605* (2013.01)

(58) Field of Classification Search
  CPC .. B60R 2300/8066; B60R 1/00; G01G 19/08; G06F 3/011; G06V 10/25; H04N 7/10; H04N 7/181; H04N 23/69; H04N 23/90; H04N 23/57
  See application file for complete search history.

(56) References Cited

U.S. PATENT DOCUMENTS

| | | | | |
|---|---|---|---|---|
| 8,878,773 | B1* | 11/2014 | Bozarth | G06V 10/143 |
| | | | | 382/103 |
| 9,274,597 | B1* | 3/2016 | Karakotsios | G06F 3/0346 |
| 9,557,568 | B1* | 1/2017 | Ouderkirk | G02B 5/3066 |
| 10,217,286 | B1* | 2/2019 | Angel | G06F 3/013 |
| 10,466,484 | B1* | 11/2019 | Yoon | H04N 13/332 |
| 10,466,779 | B1* | 11/2019 | Liu | G02B 27/0093 |
| 10,502,963 | B1* | 12/2019 | Noble | B29D 11/0073 |
| 2008/0143820 | A1* | 6/2008 | Peterson | G06T 7/97 |
| | | | | 348/E7.001 |
| 2008/0212942 | A1* | 9/2008 | Gordon | H04N 21/2365 |
| | | | | 348/E7.071 |
| 2009/0196460 | A1* | 8/2009 | Jakobs | G06V 40/19 |
| | | | | 382/103 |
| 2011/0234750 | A1* | 9/2011 | Lai | G03B 37/04 |
| | | | | 348/E7.001 |
| 2012/0249957 | A1* | 10/2012 | Shibata | A61B 3/0025 |
| | | | | 351/206 |
| 2012/0250980 | A1* | 10/2012 | Gillard | H04N 19/46 |
| | | | | 382/173 |
| 2012/0254369 | A1* | 10/2012 | Gillard | H04N 21/26258 |
| | | | | 709/219 |
| 2012/0257005 | A1* | 10/2012 | Browne | G02B 27/017 |
| | | | | 348/E7.001 |
| 2013/0038732 | A1 | 2/2013 | Waite et al. | |
| 2013/0182066 | A1* | 7/2013 | Ishimoto | E02F 9/261 |
| | | | | 348/38 |
| 2014/0037213 | A1* | 2/2014 | Niederberger | G06T 11/00 |
| | | | | 382/195 |
| 2014/0049452 | A1* | 2/2014 | Maltz | G02B 27/017 |
| | | | | 345/8 |
| 2016/0029883 | A1* | 2/2016 | Cox | G06V 40/19 |
| | | | | 351/209 |
| 2016/0085300 | A1* | 3/2016 | Robbins | G06F 3/013 |
| | | | | 345/633 |
| 2016/0241892 | A1* | 8/2016 | Cole | H04N 19/172 |
| 2016/0280136 | A1* | 9/2016 | Besson | H04N 5/265 |
| 2016/0342205 | A1* | 11/2016 | Shigeta | B60K 35/00 |
| 2018/0046859 | A1* | 2/2018 | Jarvenpaa | G02B 27/0093 |
| 2018/0262719 | A1 | 9/2018 | Jo | |
| 2018/0275409 | A1* | 9/2018 | Gao | G02B 27/0093 |
| 2018/0307048 | A1* | 10/2018 | Alexander | G03H 1/26 |
| 2019/0086674 | A1* | 3/2019 | Sinay | G06F 3/013 |
| 2020/0183174 | A1* | 6/2020 | Noui | G06F 3/013 |
| 2020/0368616 | A1* | 11/2020 | Delamont | H04N 13/239 |
| 2021/0011284 | A1* | 1/2021 | Andreev | G02B 27/0179 |
| 2021/0041948 | A1* | 2/2021 | Berkner-Cieslicki | |
| | | | | G06F 3/011 |

* cited by examiner

METHOD FOR ADAPTING TO A DRIVER POSITION AN IMAGE DISPLAYED ON A MONITOR IN A VEHICLE CAB

CROSS REFERENCE TO RELATED APPLICATIONS

This application is a 35 U.S.C. § 371 national stage application of PCT International Application No. PCT/EP2020/051679 filed on Jan. 23, 2020, the disclosure and content of which is incorporated by reference herein in its entirety.

TECHNICAL FIELD

The invention relates to a method and a system for adapting to a driver position an image displayed on a monitor in a cab of the vehicle. The invention further relates to a vehicle comprising such a system.

The invention is particularly well suited for heavy-duty vehicles, such as trucks, buses and construction equipment. The invention may also be used in other vehicles such as a car.

BACKGROUND

A trend in industrial vehicles is to replace conventional mirrors by a camera assembly that can comprise a supporting arm mounted on the vehicle cab and a camera arranged on said supporting arm, for providing a captured image of an area located rearwards and along a vehicle side. An image, resulting from the processing of the captured image, can typically be displayed on a monitor inside the driver's compartment.

The camera assembly must be arranged to provide to the vehicle driver an appropriate image displayed on the monitor, to ensure good visibility, hence safety.

However, the field of view of a camera assembly is fixed In that sense a camera differs drastically from a mirror as in a vehicle equipped with standard mirrors the driver can modify the vision field by moving his or her position on the vehicle seat to change the vision filed and therefore, for example, minimise the occurrence of blind spot.

However, in a vehicle equipped with camera instead of rear mirrors, although the driver change position on the driver seat, the field of view is not modified meaning that the image displayed on the monitoring is also not modified.

This can be disturbing especially for an experienced driver who would typically anticipate certain driving conditions such as overtaking a vehicle by changing position to change the mirror field of view so as to minimise the occurrence of a blind spot.

The patent application DE102010023160 discloses a vehicle mirror system having a mirror, whose adjustment is made as a result of head- or eye position of the driver. The adjustment of declination, height and displacement of the driver seat is taken into account during the adjustment evaluation of the mirror positioning. The head- or eye position is recorded with an image recording camera or with any sensor.

Nevertheless, this camera system is not easy to implement in a vehicle. Moreover, a significant computational power is needed to process the captured images. Finally, the reaction time of the system is quite low.

SUMMARY

An object of the invention is to provide an easy-to-implement solution to improve the visibility for a vehicle's driver, without affecting comfort and driver experience The object is achieved by a method for adapting to a driver position an image displayed on a monitor in a cab of the vehicle, the vehicle comprising a camera assembly comprising a supporting arm mounted on the cab and at least one camera arranged on said supporting arm, for providing a captured image of an area located rearwards and along a vehicle side.

The method comprises:
- determining the position of the driver on the driver seat using a determining member comprising at least one sensor located in the driver seat;
- automatically processing the captured image, according to the position of the driver on the driver seat, to display on the monitor the displayed image.

By the provision of the method for adapting to a driver position an image displayed on a monitor in a cab of the vehicle according to the present invention, the advantage is to provide an easy-to-implement method allowing an automatic adjustment of the image displayed on the monitor depending on the position of the driver on the driver seat. Additionally, this system is comfortable for the driver, less expensive than the systems of the prior art and the reaction time of this system is fast.

Preferably, the image displayed on a monitor is:
- either a first image which corresponds to a part of the captured image defined by a first field of view, in case the position of the driver is in a first configuration, i.e. an initial position of the driver on the seat,
- or a second image which corresponds to a part of the captured image defined by a second field of view, distinct from the first field of view, in case the position of the driver is in a second configuration, i.e. any driver position different from the initial position.

Preferably, the at least one sensor is selected a load sensor.

Preferably, the at least sensor is located in the seat base of the driver seat and optionally in the seat backrest of the driver seat.

Advantageously, the method further comprises transmitting the driver position information provided by said sensor through a vehicle internal communication network. In an embodiment, the second field of vision comprises a portion of the captured image that is located at any other place other than the first field of vision. In other words, the second image shows an area located lower, above, on the left or on the right with respect to the first image.

Optionally, the second field of vision further includes the first field of vision. In other words, the second image shows at least a portion of the first image in addition to the portion of the captured image that is located at any other place than the first image. For example, the second image can correspond to a zoom out or a zoom in of the first image.

Preferably, the camera assembly comprising at least one supporting arm mounted on at least one side of the vehicle and at least one camera arranged on the supporting arm. In another embodiment, the camera assembly comprises at least one camera arranged at the back of the vehicle. In another embodiment, the camera assembly comprises at least one camera arranged on the supporting arm mounted on at least one side of the vehicle and at least one camera arranged at the back of the vehicle.

According to a second aspect, the invention relates to a system for adapting to a driver position an image displayed on a monitor in a cab of the vehicle, the vehicle comprising a camera assembly for providing a captured image of an area located rearwards and along a vehicle side, characterized in that the system comprises:

a determining member comprising at least one sensor located in the driver seat, for determining a driver position on the driver seat;

a controller capable of receiving a driver position information from the determining member, and of automatically processing the captured image, according to said driver position information, to display on the monitor the image displayed.

The system may further comprises a vehicle internal communication network which links the sensor and the controller.

According to a third aspect, the invention relates to a vehicle comprising:

a cab having front wheels and rear wheels;

a camera assembly for providing a captured image of an area located rearwards and along a vehicle side;

a monitor located in the cab, for displaying an image based on the captured image;

a vehicle internal communication network;

characterized in that it further comprises a system according to the present invention, wherein the determining member and the controller are linked by the vehicle internal communication network.

Preferably, the camera is fixed relative to the cab, in the use position. Thus, the difference between the displayed first image and second image cannot be obtained through movement of the camera assembly relative to the cab, for providing different positions of the camera. For example, in this embodiment, the supporting arm of the camera assembly is fixedly mounted on the cab (but can be folded along the cab side when the vehicle is stopped).

The first image may correspond to a first field of vision of the camera and the second image corresponds to a second field of vision of the camera, wherein, as seen along a transverse direction, the lower boundary of the second field of vision is shifted from the lower boundary of the first field of vision by an angle α comprised between 5 and 45°.

It has to be noted that, in case the camera is fixed relative to the cab, in the use position, the above first and second fields of vision are virtual. In other words, the camera has one real and unique field of vision. The first field of vision would be the field of vision of a virtual camera that would provide a captured image that would be identical to the first displayed image, without image processing for altering the geometrical parameters (size, position, etc.) of the image. Similarly, the second field of vision would be the field of vision of a virtual camera that would provide a captured image that would be identical to the second displayed image, without image processing for altering the geometrical parameters (size, position, etc.) of the image.

The first and second fields of vision can have substantially the same spanning angle β. The optical axis of the second field of vision can be shifted from the optical axis of the first field of vision by said angle α.

In an embodiment, the controller is part of a camera monitoring system including the camera assembly. In other words, in this embodiment, the controller is not the electrical control unit of the vehicle.

Further advantages and advantageous features of the invention are disclosed in the following description and in the dependent claims.

BRIEF DESCRIPTION OF THE DRAWINGS

With reference to the appended drawings, below follows a more detailed description of embodiments of the invention cited as examples.

In the drawings.

DETAILED DESCRIPTION OF EXAMPLE EMBODIMENTS OF THE INVENTION

Figure 1:
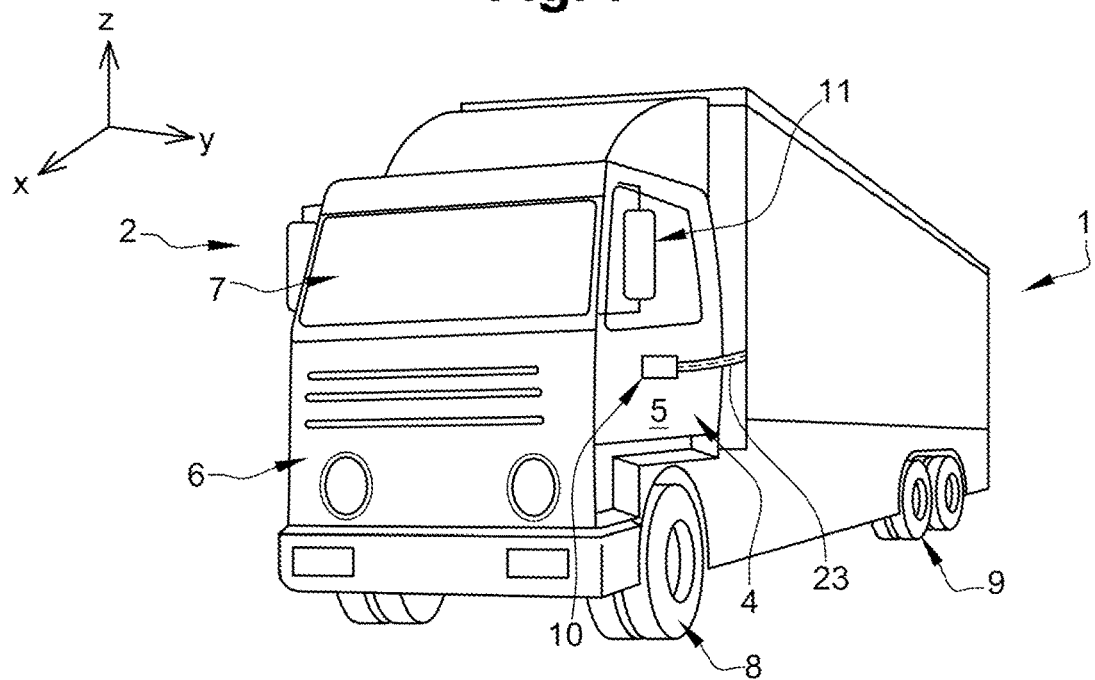
FIG. 1 is a perspective view of a vehicle according to the invention.

As illustrated in FIG. 1, the vehicle 1 comprises a cab 2 defining a driver's compartment 3. The cab 2 has side walls 4 each comprising a door 5, a bumper 6 including a windscreen 7. The cab 2 further comprises front wheels 8, and rear wheels 9.

X is defined as the longitudinal direction of the vehicle 1, Y is defined as the transversal direction and Z is defined as the vertical direction of the vehicle 1.

The vehicle 1 may comprise an electrical control unit (ECU) 10 for controlling the various electric systems of the vehicle 1.

Figure 2:
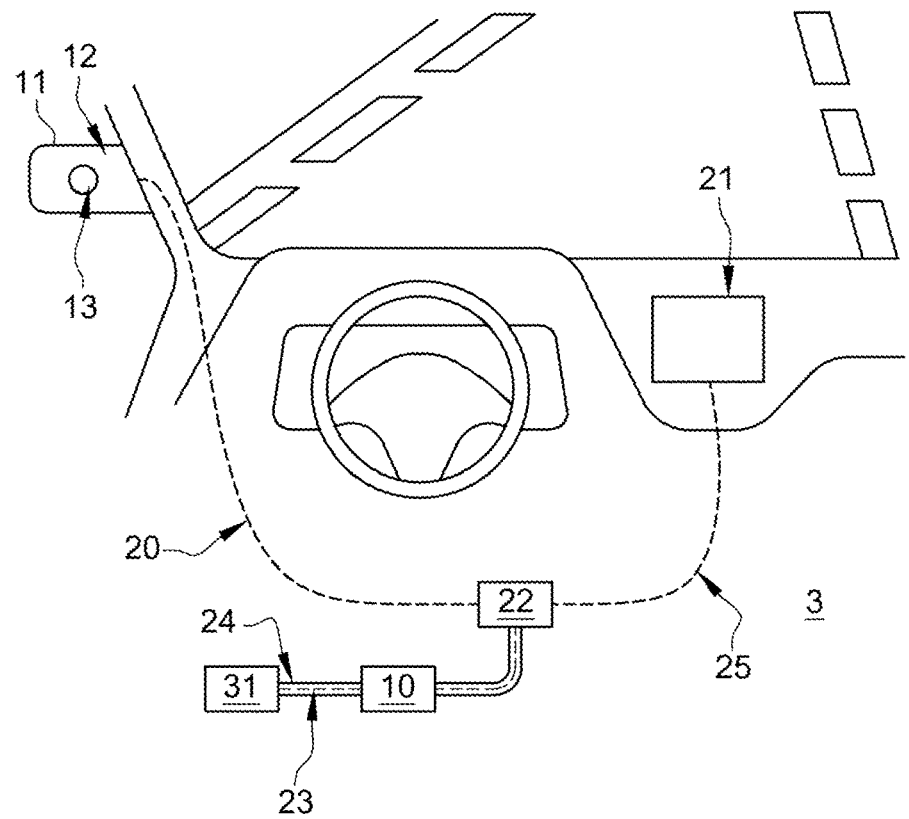
FIG. 2 is a perspective view forward from the interior of a vehicle, showing a camera assembly and a monitor for displaying an image based on the image captured by the camera assembly.

The vehicle 1 also comprises a camera assembly 11 mounted on the cab 2, typically above a front portion of the door 5, at least on the side wall 4 of the cab 2 adjacent the driver's seat. Basically, the camera assembly 11 can comprise a supporting arm 12 and a camera 13 arranged on said supporting arm 12, for providing a captured image 60 of an area surrounding the vehicle 1, more specifically an area located rearwards and along a vehicle side. The supporting arm 12 can be fixedly mounted on the cab 2, and can be equipped with a mechanism (not shown) allowing the camera assembly 11 to be:

either in a parking position, when not in use (typically when the vehicle 1 is stopped), in which the camera assembly 11 is folded against the cab side wall 4 to prevent damages;

or in a use position, in which the camera assembly 11 is protruding from the cab side wall 4, to allow the camera 13 to capture images (FIGS. 1 and 2).

Such a camera assembly 11 can typically be part of a so-called camera monitoring system (CMS) 20 which further includes a monitor 21 inside the driver's compartment 3 for displaying an image based on the captured image provided by the camera 13. Thus, the vehicle 1 according to the invention can be devoid of side exterior mirrors, and possibly also devoid of an interior mirror. The camera monitoring system 20 also includes a controller 22. The controller 22 can be connected to the ECU 10.

The vehicle 1 also can also comprise a vehicle CAN bus 23. This network 23 includes electrical wiring 24 of the vehicle 1 configured to establish electric connection and communication between the cab 2, the driver seat 20 and various vehicle components. The wiring 24 can typically be linked to the ECU 10.

According to the invention, the vehicle 1 comprises a system 25 for adapting an image displayed on the monitor 21, based on the captured image 50, to a driver configuration.

Figure 3:
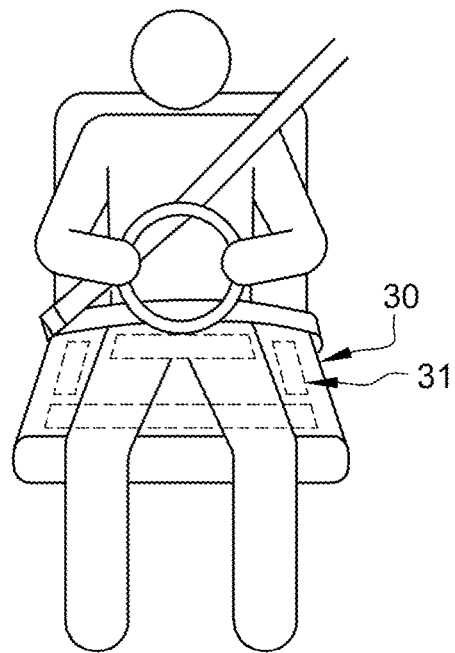
FIG. 3 is the position of the driver in the first configuration.

The system 25 comprises a determining member for determining the driver position. As shown in FIG. 3, the position of the driver is in a first configuration, i.e. the initial position of the driver on the seat 30. The determining system can comprise four pressure sensors 31 such as deformation gauge to determine a first position of the driver on the driver seat.

Figure 4:
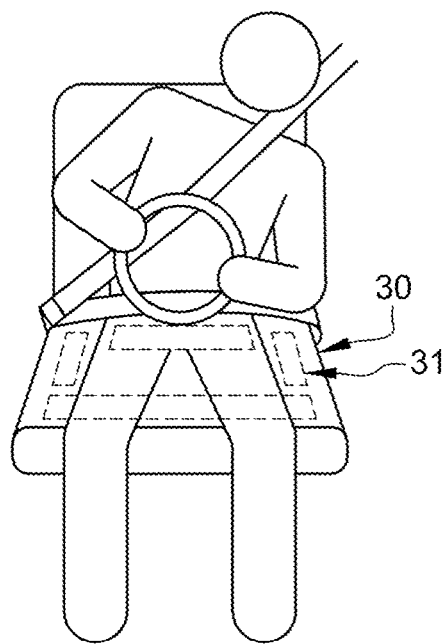
FIG. 4 is the position of the driver in the second configuration.

FIG. 4 shows the position of the driver is in a second configuration, i.e. any other position different from the first configuration. In this example, the driver is leaning forward to look at the dead angle as if the driver would do with an exterior rear mirror. One understand that by changing position form the first position to the second position, the driver weight distribution on the seat is altered. The change in the weight distribution is detected by the sensor 31. Said sensors 31 are linked to the controller 22 via the vehicle internal communication network 23 (more generally via the bundle 24 of cables). The ECU 10 can possibly be arranged between the sensor(s) 31 and the controller 22, as shown in FIG. 2, or otherwise functionally connected to both the sensor 31 and the controller 22.

The controller 22, which is part of the system 25, is capable of receiving the driver configuration information from the determining member, here the sensor(s) 31. Said information provided by the sensor(s) 31 is either "the driver is in the initial position", i.e. the driver position is in the first configuration, or "the driver has changed its position", i.e. the driver position is in the second configuration.

According to the driver configuration determined by the sensor(s) 31 and the corresponding information provided to the controller 22, the controller 22 automatically processes the captured image 50, to display on the monitor 21 a displayed image.

The image displayed can be:
  either a first image 51 which corresponds to a part of the captured image 50 defined by a first field of view 61, in case the position of the driver is in a first configuration, i.e. an initial position of the driver on the seat,
  or a second image 52 which corresponds to a part of the captured image 50 defined by a second field of view 62, distinct from the first field of view 61, in case the position of the driver is in a second configuration, i.e. any driver position different from the initial position.

Depending on the driver position, the areas of the vehicle 1 that should be visible for the driver, for driving safely and for avoiding damages to the vehicle 1 or surrounding structures, can vary.

Figure 5:
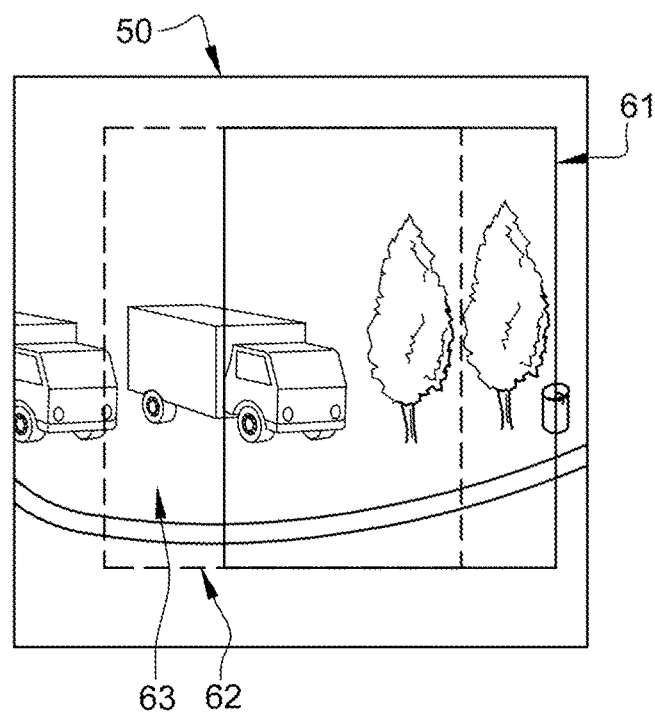
FIG. 5 shows the captured image as well as a first frame corresponding to a first image displayed and a second frame corresponding to a second displayed image.
Figure 6A:
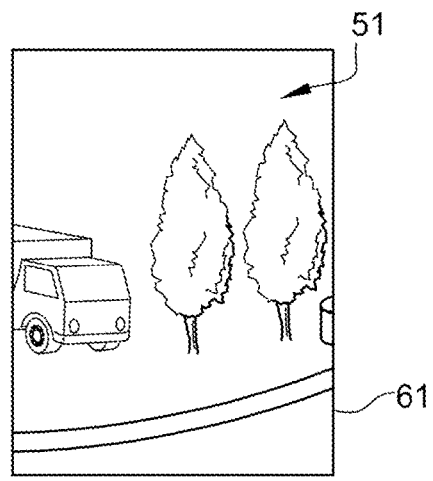
FIGS. 6a and 6b respectively show the first image displayed and the second image displayed based on the captured image of FIG. 5.
Figure 6B:
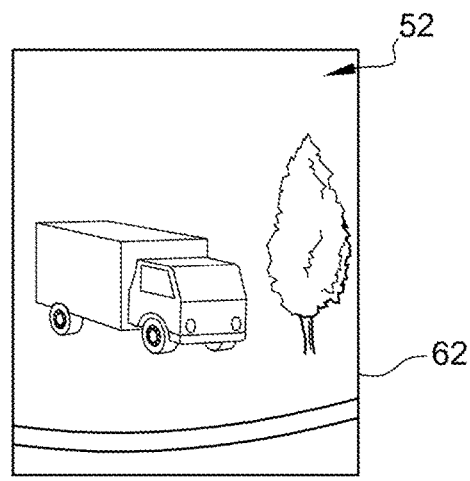

For that purpose, and because the camera 11 is preferably fixed relative to the cab 2, in the use position, the first image 51 displayed on the monitor 21 corresponds to a first field of vision 61 of the camera 13 as illustrated in FIGS. 5 and 6a in solid lines, while the second image 52 displayed on the monitor 21 corresponds to a second field of vision 62 of the camera 13 as illustrated in FIGS. 5 and 6b in dotted lines.

In practice, the camera 13 has one real and unique field of vision that includes at least the first field of vision 61 and the second field of vision 62 which are theoretically defined as follows. The first field of vision 61 would be the field of vision of a virtual camera which would provide a captured image that would be identical to the first image displayed 51, without image processing for altering the geometrical parameters (size, position, etc.) of the image. Similarly, the second field of vision 62 would be the field of vision of a virtual camera which would provide a captured image that would be identical to the second image displayed 52, without image processing for altering the geometrical parameters (size, position, etc.) of the image.

Figure 7:
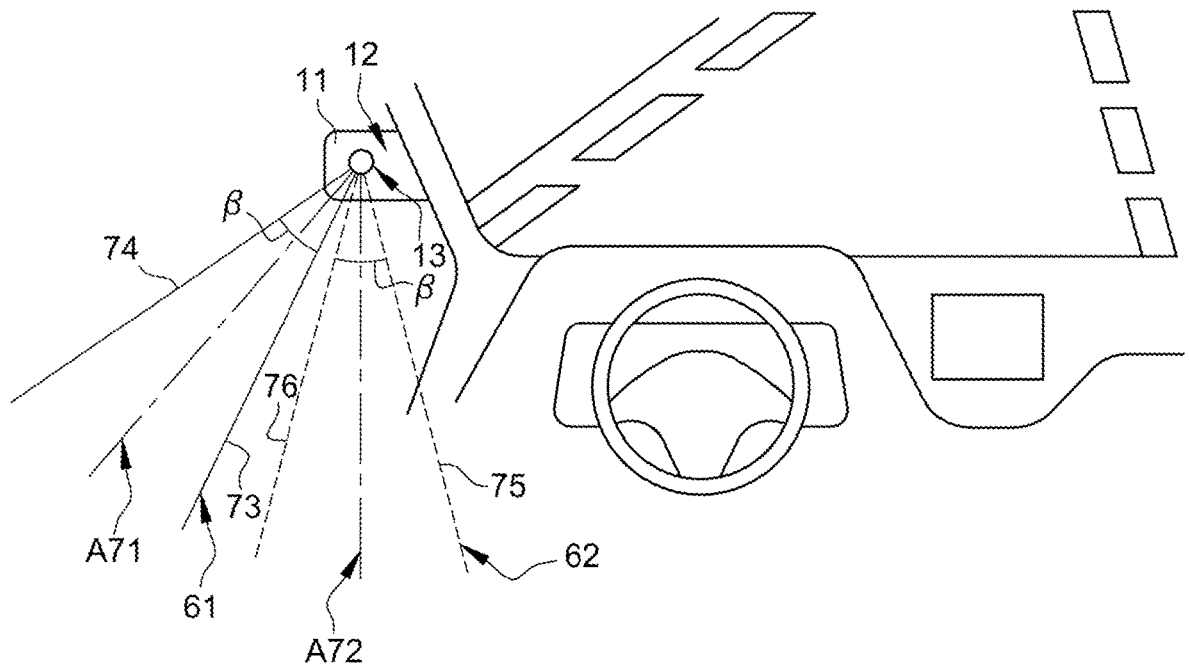
FIG. 7 is a perspective view forward the interior of a vehicle, showing two different fields of vision for displaying two different images, according to a embodiment of the invention.

When seen along a transverse direction Y towards the vehicle 1, as in FIG. 7, the first field of vision 61 has an optical axis A71, a lower boundary 73 and an upper boundary 74. Similarly, the second field of vision 62 has an optical axis A72, a lower boundary 75 and an upper boundary 76.

So that the first image 51 can show an area on the right and the second image 52 can show an area on the left, the lower boundary 75 of the second field of vision 62 can be shifted from the lower boundary 73 of the first field of vision 61 by an angle $\alpha$. This angle $\alpha$ can be comprised between 5 and 45°.

As a result, as seen in FIG. 5, the second field of vision 62—which defines the second image 52—comprises a portion 63 of the captured image 50 that is located on the left side of the first field of vision 61—which defines the first image 51.

According to an embodiment, illustrated in FIGS. 5, 6a, 6b and 7, the first and second fields of vision 61, 62 have substantially the same spanning angle $\beta$, and the optical axis A72 of the second field of vision 62 is shifted from the optical axis A71 that of the first field of vision 61 by angle $\alpha$. In other words, the upper boundary 76 of the second field of vision 62 is also shifted from the upper boundary 74 of the first field of vision 61 by angle $\alpha$.

As shown in FIGS. 5, 6a and 6b, this results in the second field of vision 62 being shifted relative to the first field of vision 61.

According to another embodiment (not illustrated), the first and second fields of vision 61, 62 have substantially the same optical axis, for example A71. Furthermore, the upper boundary 76 of the second field of vision 62 is upwardly offset from the upper boundary 74 of the first field of vision 61 by an angle $\alpha'$. Angle $\alpha'$ can be comprised between 5 and 45°. It can be identical to angle $\alpha$.

This results in the field of vision 62 including the whole first field of vision 61, as well as the above mentioned portion of the captured image 50 that is located below the first field of vision 61, and a portion of the captured image 50 that is located above the first field of vision 61. The second field of vision 62 may also comprise side portions outside and on each side of the first field of vision 61. In other words, the second image 52 is a zoom-out of the first image 51.

It is to be understood that the present invention is not limited to the embodiments described above and illustrated in the drawings; rather, the skilled person will recognize that many changes and modifications may be made within the scope of the appended claims.

The invention claimed is:
1. A method for adapting, to a driver head position, an image displayed on a monitor in a cab of a vehicle, the vehicle comprising a camera assembly comprising at least one camera for providing a captured image of a field of view located rearwards and along a vehicle side, wherein the method comprises:
  detecting a change in a head position of a driver relative to a driver seat using at least one sensor located in the driver seat; and processing the captured image, in response to the detected change in head position of the driver relative to the driver seat, to display on the monitor the image displayed.

2. The method according to claim 1, wherein the image displayed on the monitor is:
either a first image which corresponds to a part of the captured image defined by a first camera field of view, in case the head position of the driver is in a first configuration,
or a second image which corresponds to a part of the captured image defined by a second camera field of view, distinct from the first camera field of view, in case the head position of the driver is in a second configuration.

3. The method according to claim 1, wherein the at least one sensor is a load sensor.

4. The method according to claim 1, wherein the at least one sensor is located in a seat base of the driver seat.

5. The method according to claim 1, wherein the at least one sensor is located in a seat backrest of the driver seat.

6. The method according to claim 1, wherein the camera assembly comprises at least one camera-arranged on a supporting arm-mounted on at least one side of the vehicle and/or at least one camera arranged at a back of the vehicle.

7. The method according claim 1, wherein the second camera field of view comprises a portion that is located outside of the first camera field of view.

8. The method according to claim 1, wherein the second camera field of view further comprises the first camera of view.

9. A system for adapting, to a driver head position, an image displayed on a monitor in a cab of a vehicle, the vehicle comprising a camera assembly for providing a captured image of an area located rearwards and along a vehicle side, wherein the system comprises:
at least one sensor located in a driver seat, for detecting a change in a head position of a driver relative to the driver seat; and
a controller that receives driver head position information, based on the detected change in the head position of the driver, from the at least one sensor, and that processes the captured image, according to the driver head position information, to display on the monitor the image displayed.

10. A vehicle comprising:
a cab;
a camera assembly for providing a captured image of an area located rearwards and along a vehicle side;
a monitor located in the cab, for displaying an image based on the captured image;
a vehicle internal communication network;
a driver seat; and
a system for adapting, to a driver head position, an image displayed on the monitor in the cab of the vehicle, the vehicle comprising the camera assembly for providing the captured image of the area located rearwards and along the vehicle side, wherein the system comprises:
at least one sensor located in a driver seat, for detecting a change in a head position of a driver relative to the driver seat;
a controller that receives driver head position information, based on the detected change in the head position of the driver, from the at least one sensor, and that processes the captured image, according to the head position information, to display on the monitor the image displayed;
wherein the at least one sensor and the controller are linked by the vehicle internal communication network.

11. The vehicle according to claim 10, wherein the camera is fixed relative to the cab.

12. The vehicle according to claim 10, wherein, as seen along a transverse direction, a lower boundary of the second camera field of view is shifted from a lower boundary of the first camera field of view by a first angle between 5° and 45°.

13. The vehicle according to claim 12, wherein the first camera field of view and the second camera field of view have substantially a same spanning angle, and wherein an optical axis of the second field of view is shifted from an optical axis of the first field of view by the first angle.

14. The vehicle according to claim 10, wherein the controller is part of a camera monitoring system including the camera assembly.

* * * * *